(12) United States Patent
Nelson, IV (10) Patent No.: US 8,285,944 B1
(45) Date of Patent: Oct. 9, 2012

(54) READ-WRITE CONTROL OF A FIFO MEMORY WITH PACKET DISCARD

(75) Inventor: Roscoe Conkling Nelson, IV, Arvada, CO (US)

(73) Assignee: Xilinx, Inc., San Jose, CA (US)

( * ) Notice: Subject to any disclaimer, the term of this patent is extended or adjusted under 35 U.S.C. 154(b) by 1213 days.

(21) Appl. No.: 11/653,560

(22) Filed: Jan. 12, 2007

(51) Int. Cl.
*G06F 12/00* (2006.01)

(52) U.S. Cl. .......................... 711/149; 711/167
(58) Field of Classification Search .................. 711/149, 711/167; 375/372
See application file for complete search history.

(56) References Cited

U.S. PATENT DOCUMENTS 6,055,285 A * 4/2000 Alston ........................... 375/372
6,934,198 B1 * 8/2005 Lowe et al. ............... 365/189.05

* cited by examiner

*Primary Examiner* — Kevin Verbrugge
(74) *Attorney, Agent, or Firm* — LeRoy D. Maunu; Lois D. Cartier (57) ABSTRACT

A write controller controls writing of packet data to a memory, and a read controller controls reading of packet data from the memory. The write controller signals the read controller if a packet is to be discarded. In response to a discard signal from the write controller, the read controller checks whether it is in the midst of processing the packet to be discarded. If the read controller has yet to process the packet to be discarded, then no corrective action is required. However, if the read controller is in the midst of processing the packet to be discarded, then the read controller adjusts its memory read pointer to point to the position in the memory at which it began reading the packet to be discarded.

20 Claims, 4 Drawing Sheets

READ-WRITE CONTROL OF A FIFO MEMORY WITH PACKET DISCARD

FIELD OF THE INVENTION

The present invention generally relates to communication of packet data via a first-in-first-out (FIFO) memory.

BACKGROUND

A number of digital system applications involve communicating data across asynchronous clock boundaries. A writer of data is controlled in a first clock domain, and the reader of the data is controlled in another clock domain that is asynchronous to the first clock domain. In some applications a FIFO may be used to buffer the data to be communicated from the writer to the reader. The FIFO includes a memory element, a write controller, and a read controller.

Writing to the memory is controlled within the clock domain of the writer, and data from the memory is read generally asynchronous to the writing of data to the memory. The writer uses a write pointer to address a memory location for writing data, and the reader uses a read pointer to address a memory location for reading data. The write pointer and read pointer are shared between the reader and the writer in order to avoid overwriting unread data in the memory and to avoid reading from an empty location in memory.

Some applications transmit packets of data in which the data in a packet is related. The data in a packet is typically delineated by "start" and "end" markers. Depending on system requirements, there may be multiple applications that receive the data provided by the reader. Some of the applications may process the same packet in different ways, or each individual application may be seeking packets of a certain type.

Packets may enter a system via a communications channel that is susceptible to introducing data errors. In response to detecting a data error or the loss of a communications link, the system will discard the packet being received. Waiting for the reader or reading application to detect a packet error, for example, finding a partial packet having only a "start marker" without a corresponding "end marker," may result in wasted processing time by the reader. The wasting of time may be exacerbated if there are multiple applications receiving packet data. However, since the writer and reader are controlled in asynchronous clock domains and may write data to and read data from the memory at different rates, ensuring that the correct packet data is discarded without unduly delaying the flow of packets may be difficult.

The present invention may address one or more of the above issues.

SUMMARY OF THE INVENTION

The various embodiments of the invention provide various approaches for communicating packets of data via a FIFO. In one approach, a circuit arrangement comprises a memory, a write controller, and a read controller. The write controller writes words of data packets to the memory addressed by a write pointer, temporarily maintains as each data packet is written to the memory a first address that is an address at which the first word of each data packet is stored in the memory, and generates a first signal in response to a discard signal. The read controller reads words of the packets from the memory addressed by a read pointer, temporarily maintains as each data packet is read from the memory a second address that is an address from which the first word of each data packet is read from the memory. In response to the first signal, the read controller compares the first address to the second address, resets the read pointer to the second address in response to the first address being equal to the second address, and does not reset the read pointer to the second address in response to the first address being not equal to the second address. The read controller generates a second signal after reset of the read pointer. The write controller resets the write pointer to the first word address in response to the second signal from the read controller.

In another embodiment, a method for communicating packets of data is provided. The method comprises writing words of packets to a memory addressed by a write pointer. As each data packet is written to the memory, a first address that is an address at which the first word of each data packet is stored in the memory is temporarily stored. A first signal is generated in response to a discard signal. The words of the packets are read from the memory addressed by a read pointer. As each data packet is read from the memory, a second address that is an address from which the first word of each data packet is read from the memory is temporarily stored. In response to the first signal, the first address is compared to the second address, the read pointer is reset to the second address in response to the first address being equal to the second address, and the read pointer is not reset to the second address in response to the first address being not equal to the second address. A second signal is generated after resetting the read pointer, and the write pointer is reset to the first word address in response to the second signal.

In another embodiment, an apparatus is provided for communicating packets of data. The apparatus comprises means for writing words of packets to a memory addressed by a write pointer; means for temporarily storing as each data packet is written to the memory, a first address that is an address at which the first word of each data packet is stored in the memory; means for generating a first signal in response to a discard signal; means for reading words of the variable length packets from the memory addressed by a read pointer; means for temporarily maintaining as each data packet is read from the memory, a second address that is an address from which the first word of each data packet is read from the memory; means, responsive to the first signal, for comparing the first address to the second address, for resetting the read pointer to the second address in response to the first address being equal to the second address, and for not resetting the read pointer to the second address in response to the first address being not equal to the second address; means for resetting the read pointer to the second address in response to the first signal from the write controller; means for generating a second signal after resetting the read pointer; and means for resetting the write pointer to the first word address in response to the second signal.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention may be implemented in any of a variety of applications in which packets of a variable size are received in one clock domain and processed in another clock domain that is asynchronous to the first. A write controller in a first clock domain controls writing of packet data to a memory, and a read controller in a second clock domain controls reading of packet data from the memory. The write controller signals the read controller if a packet is to be discarded. In response to a discard signal from the write controller, the read controller checks whether it is in the midst of processing the packet to be discarded. If the read controller has yet to process the packet to be discarded, then no corrective action is required. However, if the read controller is in the midst of processing the packet to be discarded, then the read controller adjusts its memory read pointer to point to the position in the memory at which it began reading the packet to be discarded, which is the position at which the write controller will commence writing the next packet. This allows a packet to be discarded whether the packet is entirely within the memory or has been partially read out from the memory. In addition, the memory write pointer and memory read pointer are not used until the handshake between the write controller and read controller is complete, in order to avoid addressing invalid data in the memory.

Figure 1:
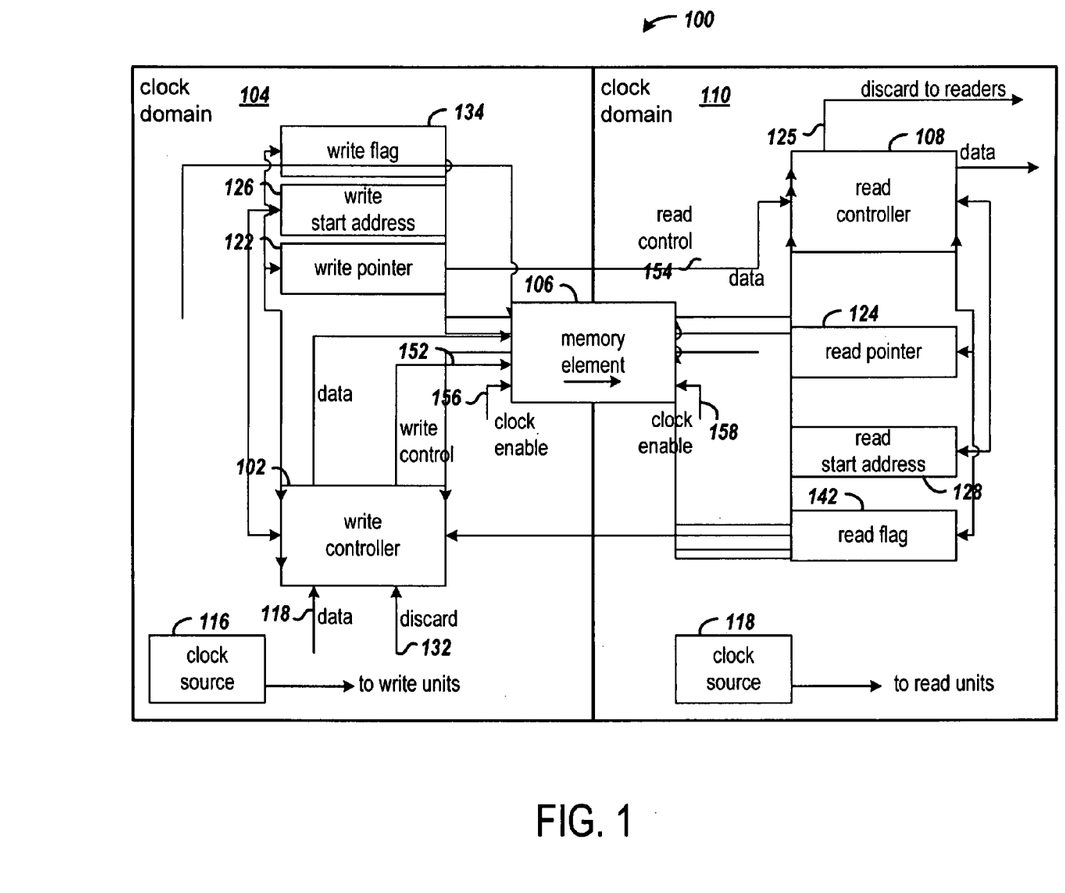
FIG. 1 is a functional block diagram of a circuit arrangement for communicating data across asynchronous clock boundaries in accordance with one or more embodiments of the invention.

FIG. 1 is a functional block diagram of a circuit arrangement 100 for communicating data across asynchronous clock boundaries in accordance with one or more embodiments of the invention. Generally, write controller 102 is clocked within clock domain 104 and controls writing of data to the memory element 106, and read controller 108 is clocked within clock domain 110 and controls reading of data from the memory element. Clock signals within clock domain 104 are generated from clock source 116, and clock signals within clock domain 110 are generated from clock source 118. It will be recognized that any clock sources suitable for design-specific requirements may be used.

The write and read controllers 102 and 108 operate the memory element 106 as a circular buffer, and memory element 106 is a dual-ported RAM to allow simultaneous writing and reading of data. The write controller writes data it receives on line 118 into the memory element at the address indicated by a write pointer, and the write pointer is incremented after the data is written. The write controller writes the value of the write pointer to the write pointer register 122 for handshaking with the read controller 108 in the event that a packet is to be discarded. The read controller reads data from the memory at an address indicated by its read pointer and subsequently increments the value of the read pointer. The read pointer register 124 is used for handshaking with the write controller in the event that a packet needs to be discarded.

When the first word of a packet is written to the memory, the write controller saves the value of the write pointer to the write start address register 126. Similarly, when the read controller reads the first word of a packet, the value of the current read pointer is stored in the read start address register 128. It will be recognized by those skilled in the art that that the detection of the first word of a packet is application dependent. For example, the first word may be detected based on the value of the word or detected based on an expected size or sizes of packets.

When the write controller receives a discard signal on line 132, it stops accepting input data and initiates the handshake protocol for discarding a packet by setting the write flag in the write flag register 134. While the write flag is set, the write controller will not change the value in the write start address register 126. The write flag is a single bit which allows it to be passed across clock domain boundaries as long as the read controller registers the bit before using the value.

The read controller 108 is coupled to the write flag register 134, and when the write flag bit is set, the read controller reads the contents of the write start address register 126 and the contents of the read start address register 128 and compares the values. The discard handshaking protocol ensures that the write start address register has been stable long enough for the read controller to safely read the contents from clock domain 104 and compare the contents of the read start address register in the local clock domain 110.

If the read start address and the write start address are equal, then the packet the read controller is currently reading is the same packet as that being written by the write controller, and that packet is the packet to be discarded. In response to the addresses being equal, the read controller resets the read pointer to the value stored in the read start address register and accordingly stores the value in the read pointer register 124. In addition, if the read start address and the write start address are equal the read controller signals on line 125 to downstream logic that the packet data read thus far should be discarded. The downstream logic may be any application-specific logic.

If the contents of the write start address register and read start address register are not equal, then the read controller need not reset the read pointer, since it is not processing the packet that is being discarded, and the read controller need not signal to the downstream logic via line 125 that the packet in progress should be discarded. Thus, the discard signal on line 125 is set to a second state, indicating that the downstream logic may continue to process the packet data.

Those skilled in the art will recognize that, depending on the application, the downstream logic would implement appropriate measures for discarding data from an in-progress packet and taking any required corrective action. Once the read controller has compared the contents of the registers and updated the read pointer if necessary, the read flag is set in the read flag register 142.

The write controller is coupled to the read flag register, and after the write controller has set the write flag the value of the read flag is considered in order to determine when it can resume receiving packet data. In response to finding the read flag being set, the write controller adjusts the write pointer to the value in the write start address register and saves that value to the write pointer register. The write flag is then cleared in the write flag register, and writing of incoming data to the memory is resumed. It will be appreciated that the write controller will not discard a packet once that packet has been completely written to the memory and the controller has commenced writing another packet to the memory. Once the write flag is cleared, the read controller clears the read flag in the read flag register and resumes reading of packet data from the memory.

The write control line 152 from the write controller to the memory element 106 includes a signal line for providing a write-enable signal to one port of the memory element. Similarly, the read control line 154 from the read controller to the memory element includes a signal line for providing a read enable signal to another port of the memory element. The port of the memory element to which the write controller writes packet data is clocked by a first clock enable signal on line 156, and the port of the memory element from which the read controller reads packet data is clocked by a clock enable signal on line 158. The clock enable signals may be asynchronous and from different clock sources as described above. Alternatively, the invention may be used in an application where the ports of the memory element are clocked from the same clock source.

In an example embodiment, the write controller and read controller use Gray coding as the write and read pointers for addressing the memory element. The Gray coding guarantees that in incrementing an address only a single bit will change on any given clock cycle. Thus, while the read controller may not have not have read the most recent write pointer, the value of the write pointer that was read will not be invalid.

Figure 2:
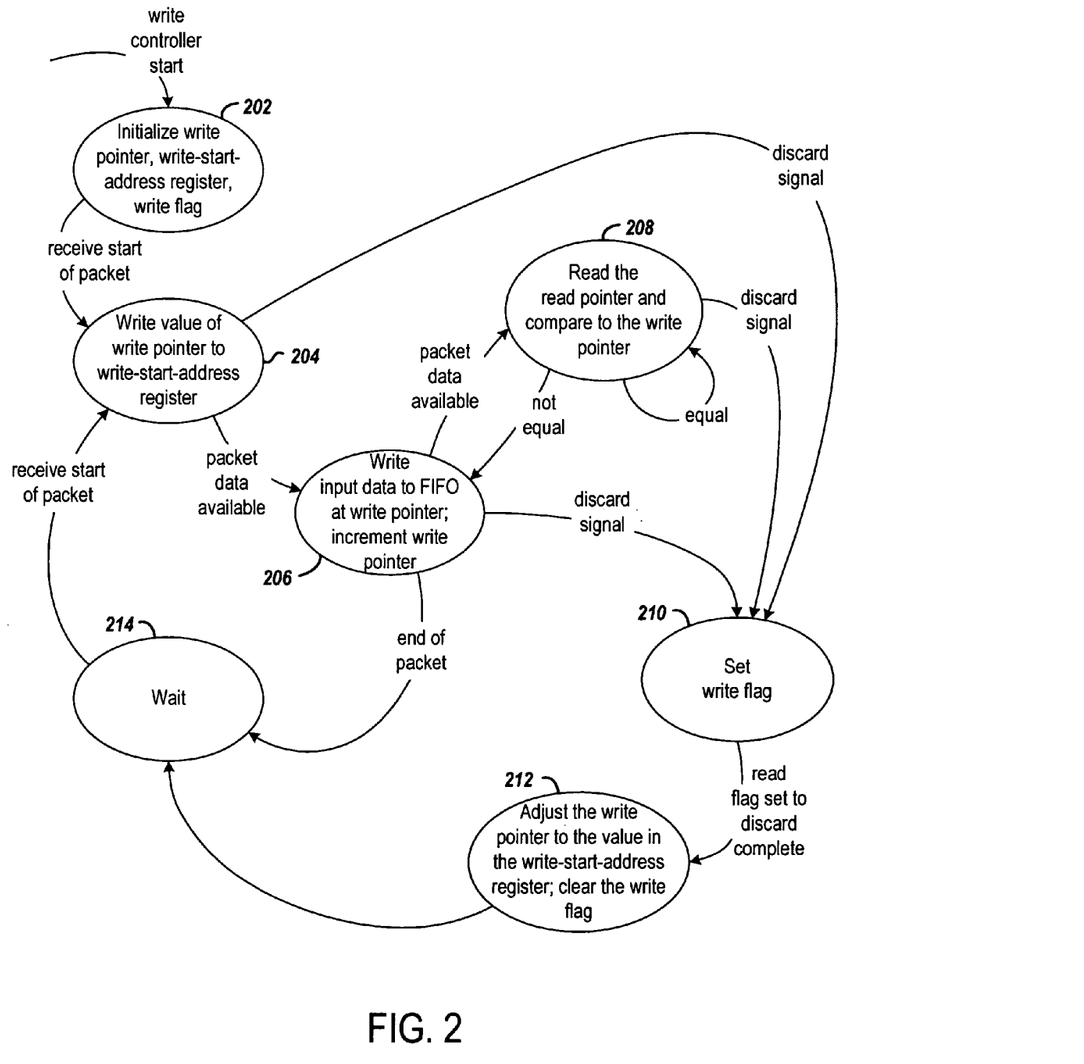
FIG. 2 is an action diagram that illustrates operation of a write controller in accordance with various embodiments of the invention.

FIG. 2 is an action diagram that illustrates operation of a write controller in accordance with various embodiments of the invention. At system startup, the write controller initializes its write pointer register 122, write start address register 126, and write flag register 134 according to implementation requirements (202). Upon receiving a signal that indicates the start of a packet, the write controller writes the value of the write pointer to the write start address register 126 (204). When a word of packet data is available and received by the write controller, the word of packet data is written to the memory at the address indicated by the write pointer, and the write pointer is incremented (206). In the example embodiment, the packet memory is implemented as a circular buffer.

In response to receipt of another word of packet data, the write controller reads the contents of the read pointer register 124 in order to avoid overwriting packet data that the read controller has not yet read from the packet memory (208). The read pointer is compared to the write pointer stored in write pointer register 122. If the write pointer and the read pointer are equal, the write controller waits until the values are no longer equal, and thereafter writes the word of the packet to the packet memory (206).

If in the midst of initialization (204), writing a word of packet data to the packet memory (206), or checking the read pointer register (208), the write controller receives a discard signal, the write controller sets the write flag in the write flag register 134 and begins checking the read flag register 142 (210) to wait for the read controller to acknowledge completion of discarding the packet.

Once the read flag has been set by the read controller, the write controller adjusts the write pointer to the value of the write start address register 126 and clears the write flag register 134 (212). The write controller then resumes waiting for another start of packet signal (214).

Figure 3:
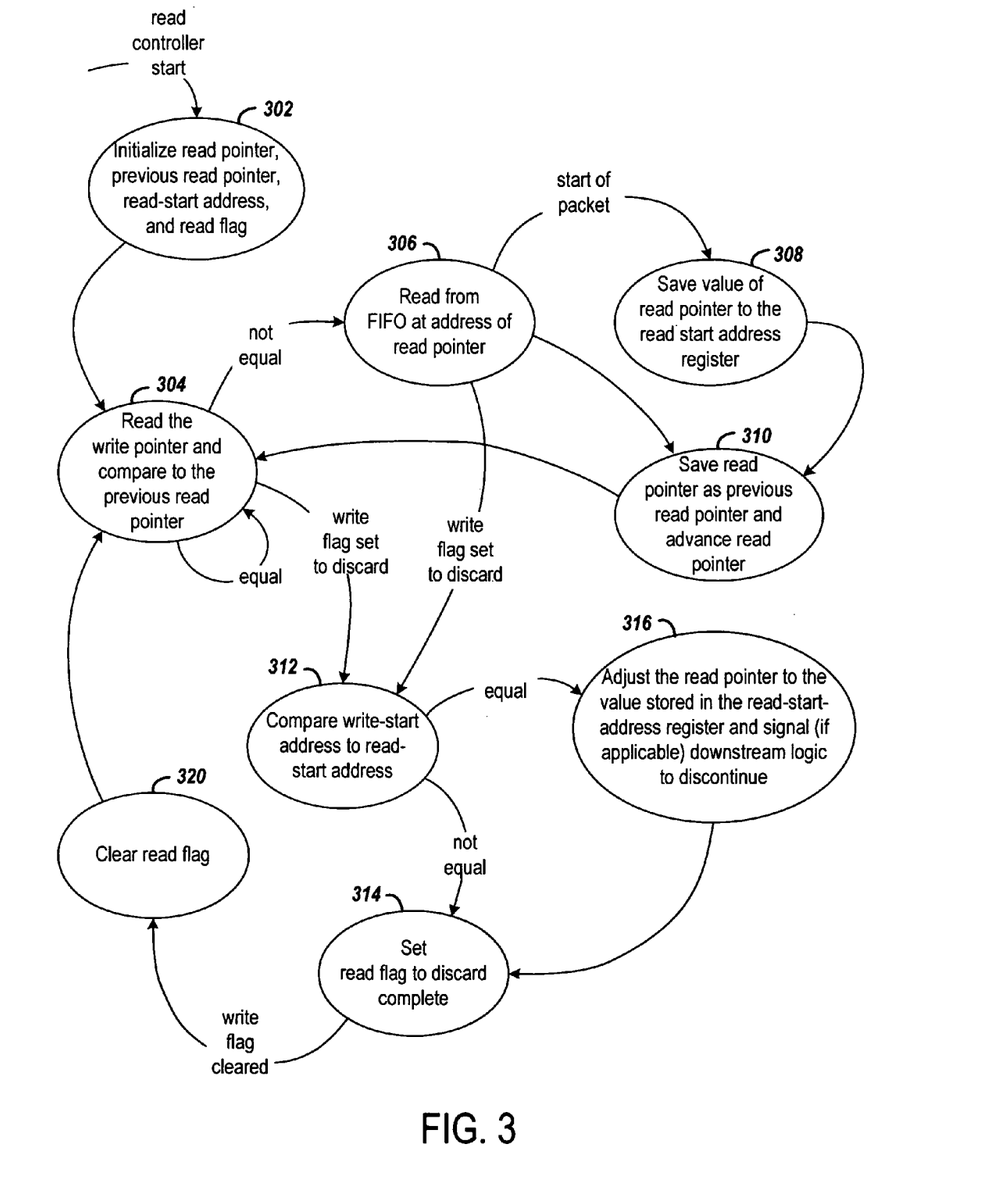
FIG. 3 is an action diagram that illustrates operation of a read controller in accordance with various embodiments of the invention.

FIG. 3 is an action diagram that illustrates operation of a read controller in accordance with various embodiments of the invention. At system startup, the read controller initializes its read pointer register 124, a previous read pointer (in a register internal to the read controller, for example), read start address register 128, and read flag register 142 according to implementation requirements (302). The previous read pointer is used because the read pointer is advanCed upon reading from the packet memory, and the previous value is needed to protect against reading past the write pointer in the circular buffer used to implement the packet memory.

After initialization, the read controller compares the contents of the write pointer register 122 to the previous read pointer (304). As long as the values are equal, the read controller will continue to check the contents of the write pointer register. Once the values are not equal, a packet data is available and the read controller reads from the packet memory at the address indicated by the read pointer register 124 (306). If the word read from the memory is the start of a packet, the read controller saves the value of the read pointer to the read start address register 128 (308), and saves the read pointer as the previous read pointer and then advances the read pointer (310). The read controller then once again compares the previous read pointer to the write pointer (304).

If, while waiting for packet data (304) or while reading from the memory (306), the write flag is found to be set to signal that a packet is to be discarded, the read controller compares the contents of the write start address register 126 to the contents of the read start address register 128 (312). If the contents are not equal, then the read controller has not yet progressed to the packet to be discarded from the packet memory, and no action is needed other than to set the read flag register to indicate that the read controller has completed the packet discard (314).

If the contents of the write start address register and the read start address register are equal, this indicates that the read controller is processing the packet to be discarded, and the read controller must adjust its pointers. Specifically, the read controller changes the read pointer to the value stored in the read start address register and signals downstream logic, if appropriate for the application, that the packet has been discarded (316). After adjusting the read pointer, the read controller sets the read flag to indicate that the discard is complete (314), and then waits for the write controller to acknowledge completion with the clearing of the write flag in the write flag register 134. The set read flag signals to the write controller that it may resume accepting input packet data. Once the write controller has cleared the write flag, the read controller clears the read flag in the read flag register 142 (320) to complete the process of discarding a packet, and then resumes reading data from the packet memory (304).

Figure 4:
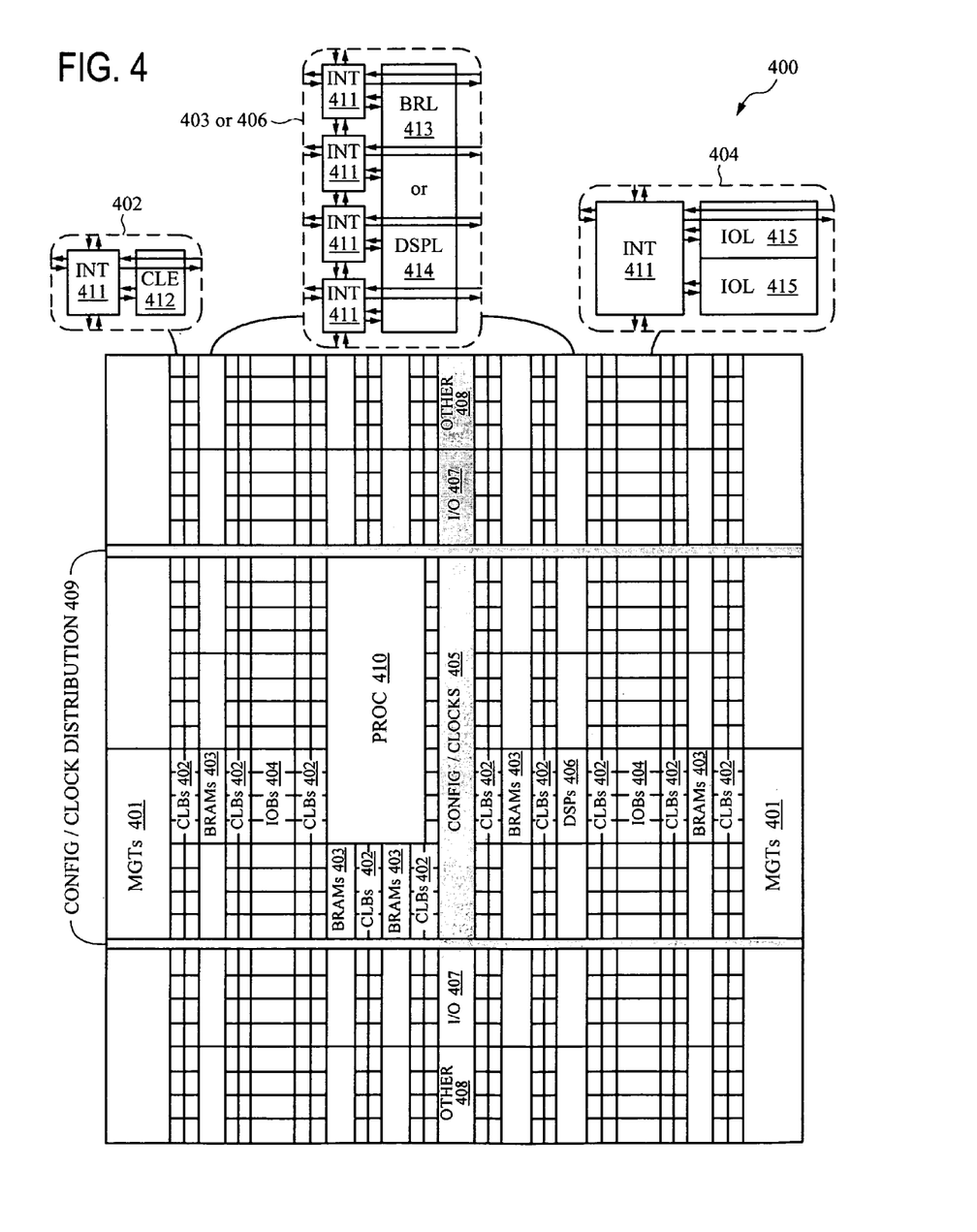
FIG. 4 illustrates a field programmable gate array (FPGA) architecture on which various embodiments of the invention may be implemented.

FIG. 4 illustrates a field programmable gate array (FPGA) architecture on which various embodiments of the invention may be implemented. For example, the logic of either or both of clock domains 104 and 110 of FIG. 1 may be implemented with the configurable logic blocks 402 in the FPGA.

Advanced FPGAs can include several different types of programmable logic blocks in the array. The example FPGA 400 includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

It will be appreciated that PLDs having different layouts of CLBs, IOBs, and interconnect circuitry (and the functional equivalents thereof) may also implement the various embodiments of the invention described herein. Those skilled in the art will appreciate that various alternative computing or processor or microprocessor arrangements, including one or more processors and a memory arrangement configured with program code, would be suitable for implementing the methods of the present invention. In addition, the processes may be provided via a variety of computer-readable media or delivery channels such as magnetic or optical disks or tapes, electronic storage devices, or as application services over a network.

The present invention is thought to be applicable to a variety of systems for the communication of packet data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement for communicating packets of data, comprising:
    a memory;
    a write controller coupled to the memory, wherein the write controller is configured to write words of data packets to the memory addressed by a write pointer from a write pointer register, maintain in a write start address register as each data packet is written to the memory a first address that is an address at which a first word of each data packet is stored in the memory, and generate a first signal in response to a first discard signal;
    wherein for data packets having one word and for data packets having more than one word, the first address of each packet is maintained in the write start address register while writing words of the packet in the memory and updating the write pointer in the write pointer register;
    a read controller coupled to the write controller and to the memory, wherein the read controller is configured to read words of the data packets from the memory addressed by a read pointer from a read pointer register and temporarily maintain in a read start address register as each data packet is read from the memory a second address that is an address from which the first word of each data packet is read from the memory;
    wherein for data packets having one word and for data packets having more than one word, the second address of each packet is maintained in the read start address register while reading words of the packet from the memory and updating the read pointer in the read pointer register;
    wherein the read controller is further configured to compare, in response to the first signal, the first address to the second address, reset the read pointer to the second address in response to the first address being equal to the second address, and not reset the read pointer to the second address in response to the first address being not equal to the second address, and generate a second signal after reset of the read pointer; and
    wherein the write controller is further configured to reset the write pointer to the first address in response to the second signal from the read controller.

2. The circuit arrangement of claim 1, wherein the memory is maintained as a circular buffer.

3. The circuit arrangement of claim 2, wherein the memory is a dual-port memory, and the write controller is coupled to a first port of the dual-port memory and the read controller is coupled to a second port of the dual-port memory.

4. The circuit arrangement of claim 3, wherein the first port of the dual-port memory and the write controller are clocked in a first clock domain, and the second port of the dual-port memory and the read controller are clocked in a second clock domain that is asynchronous to the first clock domain.

5. The circuit arrangement of claim 4, wherein the memory, the write controller, and the read controller are implemented in an FPGA.

6. The circuit arrangement of claim 4, wherein the write controller and the read controller use Gray codes for the write pointer and read pointer, respectively.

7. The circuit arrangement of claim 4, further comprising:
    wherein the write pointer register is clocked in the first clock domain and is coupled to the write controller and to the read controller;
    wherein the write start address register is clocked in the first clock domain and is coupled to the write controller and to the read controller;
    a write flag register clocked in the first clock domain and coupled to the write controller and to the read controller;
    wherein the read pointer register is clocked in the second clock domain and is coupled to the read controller and to the write controller;
    wherein the read start address register is clocked in the second clock domain and is coupled to the read controller;

a read flag register clocked in the second clock domain and coupled to the read controller and to the write controller; and wherein the write controller is further configured to write the write pointer to the write pointer register, write the first address to the write start address register, input the first signal to the write flag register, and read from the read flag register, and the read controller is further configured to write the read pointer to the read pointer register, write the second address to the read start address register, and input the second signal to the read flag register.

8. The circuit arrangement of claim 1, wherein the data packets are of variable length.

9. The circuit arrangement of claim 8, wherein the memory is maintained as a circular buffer.

10. The circuit arrangement of claim 9, wherein the memory is a dual-port memory, and the write controller is coupled to a first port of the dual-port memory and the read controller is coupled to a second port of the dual-port memory.

11. The circuit arrangement of claim 10, wherein the first port of the dual-port memory and the write controller are clocked in a first clock domain, and the second port of the dual-port memory and the read controller are clocked in a second clock domain that is asynchronous to the first clock domain.

12. The circuit arrangement of claim 11, wherein the memory, the write controller, and the read controller are implemented in an FPGA.

13. The circuit arrangement of claim 1, wherein the read controller is further configured to generate a second discard signal in a first state in response to the first address being equal to the second address, and generate the second discard signal in a second state in response to the first address being not equal to the second address, wherein the first state is different from the second state, and the state of the second discard signal indicates to circuitry that processes packet data read from the memory whether data from an in-progress data packet should be discarded.

14. A method for communicating packets of data, comprising:

writing words of data packets to a memory addressed by a write pointer from a write point register;

temporarily storing in a write start address register as each data packet is written to the memory, a first address that is an address at which a first word of each data packet is stored in the memory;

wherein for data packets having one word and for data packets having more than one word, the first address of each packet is maintained in the write start address register while writing words of the packet in the memory and updating the write pointer in the write pointer register;

generating a first signal in response to a discard signal;

reading words of the data packets from the memory addressed by a read pointer from a read pointer register;

temporarily maintaining in a read start address register as each data packet is read from the memory, a second address that is an address from which the first word of each data packet is read from the memory;

wherein for data packets having one word and for data packets having more than one word, the second address of each packet is maintained in the read address while reading words of the packet from the memory and updating the read pointer in the read pointer register;

in response to the first signal from the write controller, comparing the first address to the second address, resetting the read pointer to the second address in response to the first address being equal to the second address, and not resetting the read pointer to the second address in response to the first address being not equal to the second address;

generating a second signal after resetting the read pointer; and resetting the write pointer to the first address in response to the second signal.

15. The method of claim 14, further comprising addressing the memory as a circular buffer for reading and writing.

16. The method of claim 15, wherein the memory is a dual-port memory and further comprising:

writing each word of a data packet to a first port of the dual-port memory; and reading each word of a data packet from a second port of the dual-port memory.

17. The method of claim 16, further comprising:

clocking the first port of the dual-port memory in a first clock domain; and clocking the second port of the dual-port memory in a second clock domain that is asynchronous to the first clock domain.

18. The method of claim 17, further comprising configuring an FPGA to implement the memory.

19. The method of claim 16, wherein the data packets are of variable length.

20. An apparatus for communicating packets of data, comprising:

means for writing words of data packets to a memory addressed by a write pointer from a write pointer register;

means for temporarily storing in a write start address register as each data packet is written to the memory, a first address that is an address at which a first word of each data packet is stored in the memory;

wherein for data packets having one word and for data packets having more than one word, the first address of each packet is maintained in the write start address register while writing words of the packet in the memory and updating the write pointer in the write pointer register;

means for generating a first signal in response to a discard signal;

means for reading words of the data packets from the memory addressed by a read pointer from a read pointer register;

means for temporarily maintaining in a read start address register as each data packet is read from the memory, a second address that is an address from which the first word of each data packet is read from the memory;

wherein for data packets having one word and for data packets having more than one word, the second address of each packet is maintained in the read start address register while reading words of the packet from the memory and updating the read pointer in the read pointer register;

means, responsive to the first signal, for comparing the first address to the second address, for resetting the read pointer to the second address in response to the first address being equal to the second address, and for not resetting the read pointer to the second address in response to the first address being not equal to the second address;

means for generating a second signal after resetting the read pointer; and means for resetting the write pointer to the first address in response to the second signal.

* * * * *